(12) United States Patent
Asa

(10) Patent No.: US 10,597,087 B2
(45) Date of Patent: Mar. 24, 2020

(54) VEHICLE SIDE PORTION STRUCTURE

(71) Applicant: TOYOTA JIDOSHA KABUSHIKI KAISHA, Toyota-shi, Aichi-ken (JP)

(72) Inventor: Ryosuke Asa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 16/013,188

(22) Filed: Jun. 20, 2018

(65) Prior Publication Data

US 2019/0047629 A1 Feb. 14, 2019

(30) Foreign Application Priority Data

Aug. 10, 2017 (JP) .................. 2017-156035

(51) Int. Cl.
  *B62D 25/02* (2006.01)
  *B62D 25/04* (2006.01)
  *B62D 27/02* (2006.01)

(52) U.S. Cl.
  CPC ........... *B62D 25/04* (2013.01); *B62D 25/025* (2013.01); *B62D 27/023* (2013.01)

(58) Field of Classification Search
  CPC ....... B62D 25/02; B62D 25/025; B62D 25/04

USPC .............. 296/187.12, 193.06, 209
See application file for complete search history.

(56) References Cited

U.S. PATENT DOCUMENTS 8,366,184 B2 * 2/2013 Ogawa .............. B62D 21/157
                                                      296/193.06
9,045,165 B2 * 6/2015 Kurokawa ............ B62D 25/02
2006/0237996 A1 10/2006 Eipper et al.
2010/0308623 A1 12/2010 Bodin et al.

FOREIGN PATENT DOCUMENTS

JP   2005-537179 A   12/2005
JP   2011-502881 A   1/2011

* cited by examiner

*Primary Examiner* — Jason S Daniels
(74) *Attorney, Agent, or Firm* — Oliff PLC (57) ABSTRACT

A vehicle side portion structure that includes: a rocker provided at a vehicle width direction outer side end portion of a lower portion of a vehicle body, the rocker extending in a vehicle front-and-rear direction; and a pillar that extends in a vehicle vertical direction, a lower end portion of the pillar being joined to the rocker. A bellows portion is provided at the lower end portion of the pillar. The bellows portion is provided at a vehicle upper side of a joining portion of the pillar with the rocker, and protrusions and recesses are formed in the bellows portion to alternate in the vehicle vertical direction.

6 Claims, 6 Drawing Sheets

VEHICLE SIDE PORTION STRUCTURE

CROSS-REFERENCE TO RELATED APPLICATION

This application is based on and claims priority under 35 USC 119 from Japanese Patent Application No. 2017-156035 filed on Aug. 10, 2017, which is incorporated by reference herein.

BACKGROUND

Technical Field

The present disclosure relates to a vehicle side portion structure.

Related Art

Japanese Patent Application National Publication No. 2011-502881 discloses a structure of a B pillar (a center pillar) with a tensile strength of at least 1300 MPa, which structure includes a soft region with a tensile strength of less than 800 MPa at a lower portion of the B pillar. Japanese Patent Application National Publication No. 2005-537179 discloses a vehicle formed of a plural number of modules, and recites a B column (a center pillar) being fixed (joined) to the modules when the modules are assembled.

Structures such as a structure in which the strength of a rocker is improved and intrusion of the rocker to a vehicle inner side when a side collision occurs are known. However, when a side collision occurs with this structure, a relative displacement amount of a pillar to the vehicle width direction inner side relative to the rocker is large. As a result, a lower portion of the pillar is pulled excessively. Even if a lower portion of the center pillar is made soft as in Japanese Patent Application National Publication No. 2011-502881, there is scope for improvement in techniques for inhibiting breakage of the lower portion of a pillar.

SUMMARY OF INVENTION

An aspect of a vehicle side portion structure includes: a rocker provided at a vehicle width direction outer side end portion of a lower portion of a vehicle body, the rocker extending in a vehicle front-and-rear direction; and a pillar that extends in a vehicle vertical direction, a lower end portion of the pillar being joined to the rocker. A bellows portion is provided at the lower end portion of the pillar. The bellows portion is provided at a vehicle upper side of a joining portion of the pillar with the rocker, and protrusions and recesses are formed in the bellows portion to alternate in the vehicle vertical direction.

BRIEF DESCRIPTION OF DRAWINGS

FIG. 4 is a sectional diagram showing a state in which FIG. 2 is cut along line 4-4.

FIG. 5 is a sectional diagram showing a state in which FIG. 3 is cut along line 5-5.

DESCRIPTION OF EMBODIMENTS

A vehicle side portion structure according to an exemplary embodiment is described with reference to the drawings. An arrow FR, an arrow UP and an arrow OUT that are shown where appropriate in the drawings indicate, respectively, a forward direction of the vehicle, an upward direction, and an outward direction in the vehicle width direction. Herebelow, where descriptions are given simply using the directions front, rear, up, down, left and right, unless otherwise specified, these represent the front and rear in the vehicle front-and-rear direction, up and down in the vehicle vertical direction, and left and right in the vehicle width direction if facing in a progress direction.

—Overall Structure of Vehicle Side Portion—

Figure 1:
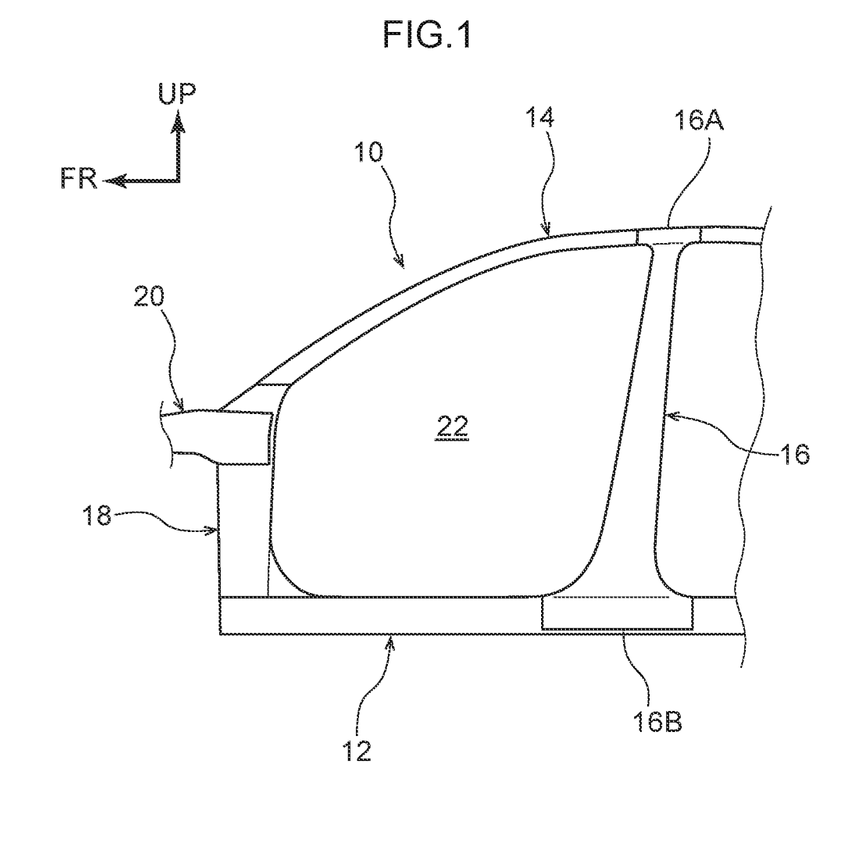
FIG. 1 is a side view showing a side portion of a vehicle in which a vehicle side portion structure according to an exemplary embodiment is employed.

As shown in FIG. 1, the vehicle side portion structure according to the present exemplary embodiment principally includes a roof rail 14 that is a framework member, a rocker 12 that is a framework member, and a center pillar 16.

The roof rail 14 is provided at a vehicle upper portion of a vehicle width direction outer side end portion of a vehicle body 10. The roof rail 14 extends in the vehicle front-and-rear direction. The roof rail 14 is formed with a chamber structure and structures a framework of the vehicle. A left and right pair of the roof rail 14 are provided at two vehicle width direction end portions of the vehicle body 10. The pair of roof rails 14 are structured with left-right symmetry. Accordingly, only the roof rail 14 at the vehicle left side is shown in the drawings and described in the descriptions below.

The rocker 12 is provided at a vehicle lower portion at the vehicle width direction outer side end portion of the vehicle body 10. The rocker 12 extends in the vehicle front-and-rear direction and structures the framework of the vehicle. As an example in the present exemplary embodiment, the rocker 12 is formed in a chamber structure by extrusion molding of a lightweight metal such as an aluminium alloy or the like. A left and right pair of the rocker 12 are provided at the two vehicle width direction end portions of the vehicle body 10. The pair of rockers 12 are structured with left-right symmetry. Accordingly, only the rocker 12 at the vehicle left side is shown in the drawings and described in the descriptions below.

A front end portion of the rocker 12 and a front end portion of the roof rail 14 are linked by a front pillar 18. The front pillar 18 is a member with a chamber structure extending in the vehicle vertical direction. An upper end portion of the front pillar 18 is joined to the front end portion of the roof rail 14, and a lower end portion of the front pillar 18 is joined to the front end portion of the rocker 12. The front pillar 18 is also joined to a rear end portion of a front side member 20 that extends in the vehicle front-and-rear direction.

The center pillar 16 is provided at the vehicle rear side relative to the front pillar 18. The center pillar 16 extends in the vehicle vertical direction. An upper end portion 16A of the center pillar 16 is joined to the roof rail 14, and a lower end portion 16B of the center pillar 16 is joined to the rocker 12. Detailed structures of the center pillar 16 are described below.

A region encircled by the roof rail 14, rocker 12, front pillar 18 and center pillar 16 described above serves as a door aperture portion 22. Thus, the roof rail 14 structures an upper edge of the door aperture portion 22, the rocker 12 structures a lower edge of the door aperture portion 22, the front pillar 18 structures a front edge of the door aperture portion 22, and the center pillar 16 structures a rear edge of the door aperture portion 22. The door aperture portion 22 is closed up by a front door.

—Joining Portion Between Center Pillar and Roof Rail—

Figure 2:
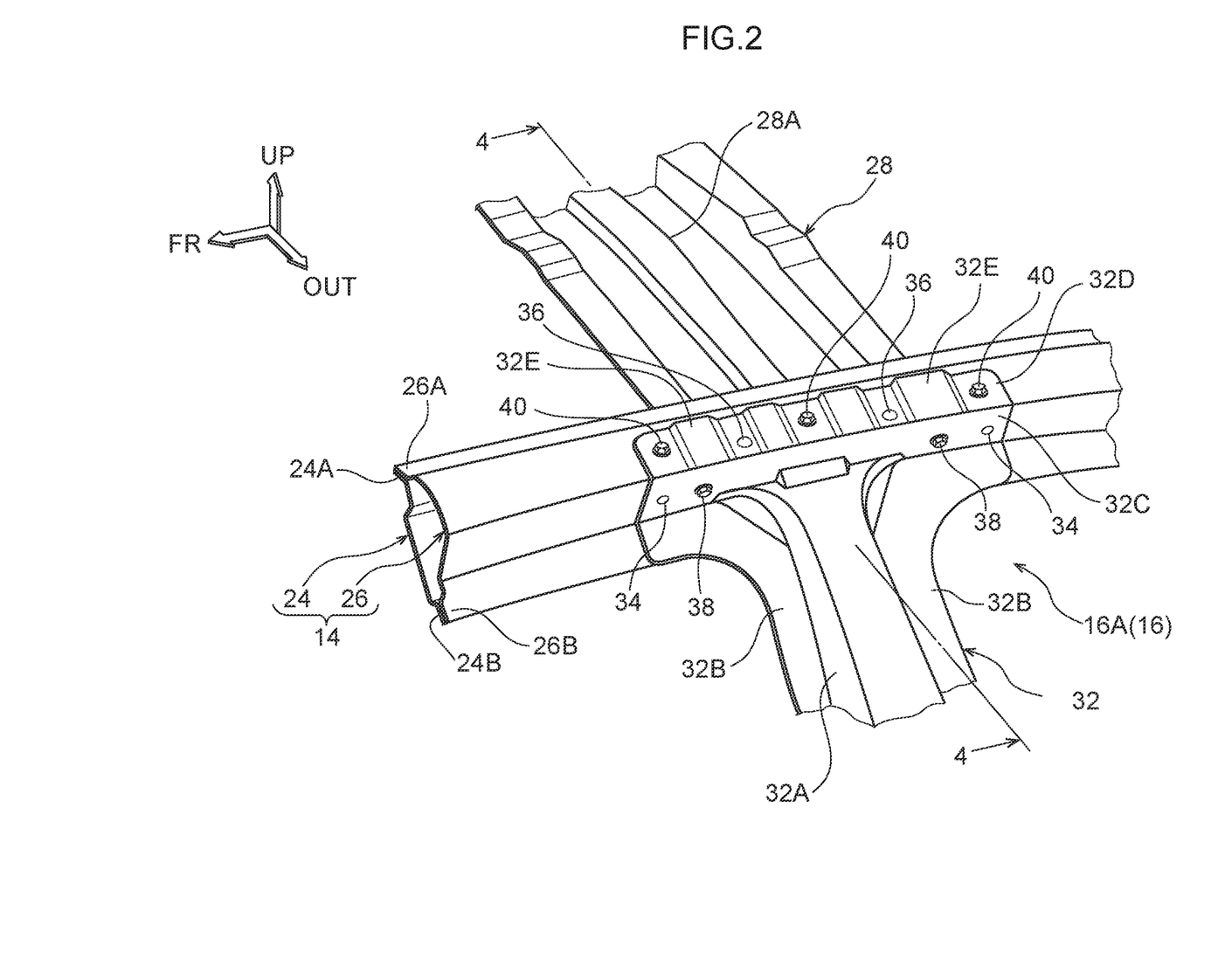
FIG. 2 is a magnified perspective view showing a magnification of a joining region between a center pillar and a roof rail in FIG. 1.

Now, a joining portion between the upper end portion 16A of the center pillar 16 and the roof rail 14 is described in detail. As shown in FIG. 2, the roof rail 14 includes a roof rail outer panel 26 disposed at the vehicle width direction outer side and a roof rail inner panel 24 disposed at the vehicle width direction inner side. The roof rail outer panel 26 is formed substantially in a hat shape in cross section, opening to the vehicle width direction inner side. An outer side upper flange 26A projects to the vehicle width direction inner side from an upper end portion of the roof rail outer panel 26. An outer side lower flange 26B projects to the vehicle lower side and vehicle width direction outer side from a lower end portion of the roof rail outer panel 26.

The roof rail inner panel 24 is formed substantially in a hat shape in cross section, opening to the vehicle width direction outer side. An inner side upper flange 24A projects to the vehicle width direction inner side from an upper end portion of the roof rail inner panel 24. An inner side lower flange 24B projects to the vehicle lower side and vehicle width direction outer side from a lower end portion of the roof rail inner panel 24. The outer side upper flange 26A and inner side upper flange 24A are welded together in a superposed state, and the outer side lower flange 26B and inner side lower flange 24B are welded together in a superposed state. Thus, the roof rail 14 is formed with the chamber structure.

A roof reinforcement 28 is connected to the roof rail inner panel 24. The roof reinforcement 28 extends in the vehicle width direction and spans between the left and right roof rails 14. A vehicle front-and-rear direction middle portion of the roof reinforcement 28 is recessed, and a protruding bead 28A extending in the vehicle width direction is formed in this recessed portion.

Figure 4:
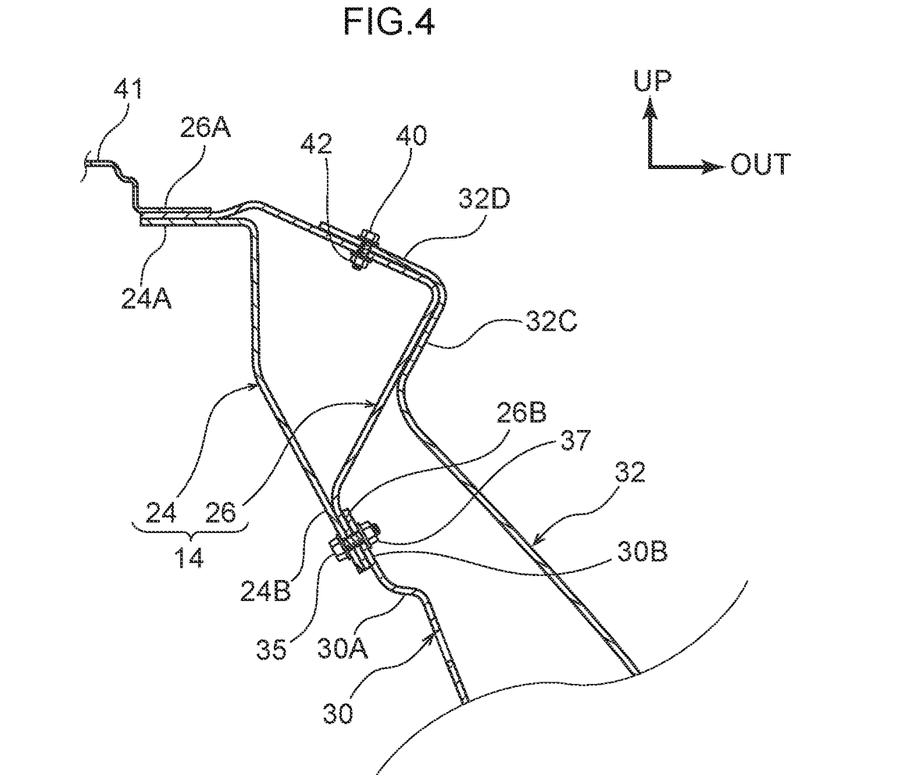

As shown in FIG. 2 and FIG. 4, the center pillar 16 is formed as a chamber structure, including a pillar outer panel 32 that structures a vehicle outer side of the center pillar 16 and a pillar inner panel 30 that structures a vehicle inner side of the center pillar 16. The pillar outer panel 32 is formed substantially in a hat shape in cross section overall, including a pillar main body portion 32A and flange portions 32B. In plan view, the pillar main body portion 32A has a substantial "C" shape in cross section, of which the vehicle width direction inner side is open. The flange portions 32B project to the front and rear from the pillar main body portion 32A.

Upper end portions of the flange portions 32B are widened in the vehicle front-and-rear direction along the outer side lower flange 26B of the roof rail outer panel 26. The upper end portions of the flange portions 32B are superposed with the outer side lower flange 26B.

A first joining surface 32C projects toward the vehicle upper side and vehicle width direction outer side along the roof rail outer panel 26 from upper end portions of the flange portions 32B. The first joining surface 32C is superposed with the roof rail outer panel 26 and is temporarily joined thereto by blind rivets 34, which are temporary joining members. The first joining surface 32C and roof rail outer panel 26 are mechanically joined (fastened) by bolts 38 and weld nuts, which are fastening members with higher joining strengths than the blind rivets 34.

More specifically, the two vehicle front-and-rear direction end portions of the first joining surface 32C are temporarily joined by the blind rivets 34. The blind rivets 34 are inserted from the vehicle outer side of the first joining surface 32C and expanded at the back face side (chamber side) of the roof rail outer panel 26. A weld nut is attached to the back face side of the roof rail outer panel 26 at a position spaced toward the vehicle rear side from the blind rivet 34 that is at the front side. One of the bolts 38 is screwed in and threaded into the weld nut from the vehicle outer side of the first joining surface 32C. Similarly, a weld nut is attached to the back face side of the roof rail outer panel 26 at a position spaced toward the vehicle front side from the blind rivet 34 that is at the rear side. Another of the bolts 38 is screwed in and threaded into this weld nut from the vehicle outer side of the first joining surface 32C. That is, in the present exemplary embodiment, the first joining surface 32C and the roof rail outer panel 26 are fastened together at two locations by the bolts 38 and weld nuts. Similarly, in the descriptions below, fastening by bolts and weld nuts has a higher joining strength than blind rivets.

A second joining surface 32D of the pillar outer panel 32 projects to the vehicle upper side and the vehicle width direction inner side along the roof rail outer panel 26 from an upper end portion of the first joining surface 32C. The second joining surface 32D is superposed with the roof rail outer panel 26 and is temporarily joined thereto by blind rivets 36, which are temporary joining members. The second joining surface 32D and the roof rail outer panel 26 are mechanically joined (fastened) by bolts 40 and weld nuts 42, which are fastening members.

More specifically, four protruding beads 32E that are spaced apart in the vehicle front-and-rear direction are formed on the second joining surface 32D. A region between a first of the protruding beads 32E from the front side and the second of the protruding beads 32E is temporarily joined by one of the blind rivets 36. The blind rivet 36 is inserted from the vehicle outer side of the second joining surface 32D and expanded at the back face side (chamber side) of the roof rail outer panel 26. Similarly, a region between the third of the protruding beads 32E from the front side and the fourth of the protruding beads 32E is temporarily joined by another of the blind rivets 36.

The weld nuts 42 are attached to the back face side of the roof rail outer panel 26 at three locations of the second joining surface 32D, at both end portions and a middle portion in the vehicle front-and-rear direction (in FIG. 4, only the weld nut 42 at the middle portion in the vehicle front-and-rear direction is shown). The bolts 40 are screwed in and threaded into the weld nuts 42 from the vehicle outer side of the second joining surface 32D. Thus, in the present exemplary embodiment, the second joining surface 32D and the roof rail outer panel 26 are fastened together at three locations by the bolts 40 and weld nuts 42.

The pillar inner panel 30 is provided at the vehicle width direction inner side of the pillar outer panel 32. The pillar inner panel 30 is formed substantially in a hat shape in cross section, opening to the vehicle width direction outer side. Flange portions provided at two vehicle front-and-rear direction end portions of the pillar inner panel 30 are superposed with and welded to the flange portions 32B of the pillar outer panel 32.

A step portion 30A is provided at an upper portion of the pillar inner panel 30. An upper end portion of the pillar inner panel 30 is formed as a flange portion 30B, which is displaced to the vehicle width direction inner side relative to a general portion of the pillar inner panel 30 by the step portion 30A. The flange portion 30B is superposed with the outer side lower flange 26B of the roof rail outer panel 26, and is mechanically joined (fastened) thereto by bolts 35 and weld nuts 37.

More specifically, the weld nuts 37 are attached to the back face side (chamber side) of the flange portion 30B of the pillar inner panel 30. The bolts 35 are screwed in and threaded into the weld nuts 37 from the vehicle width direction inner side of the roof rail inner panel 24. Consequently, three plates—the flange portion 30B of the pillar inner panel 30, the outer side lower flange 26B of the roof rail outer panel 26, and the inner side lower flange 24B of the roof rail inner panel 24—are fastened together by the bolts 35 and weld nuts 37.

The pillar inner panel 30 is fastened to the roof rail 14 at three locations, in a similar manner to the second joining surface 32D of the pillar outer panel 32. The pillar inner panel 30 is temporarily joined by blind rivets at two locations between the fastening locations. Thus, as described above, the upper end portion 16A of the center pillar 16 is joined to the roof rail 14.

—Joining Portion Between Center Pillar and Rocker—

Figure 5:
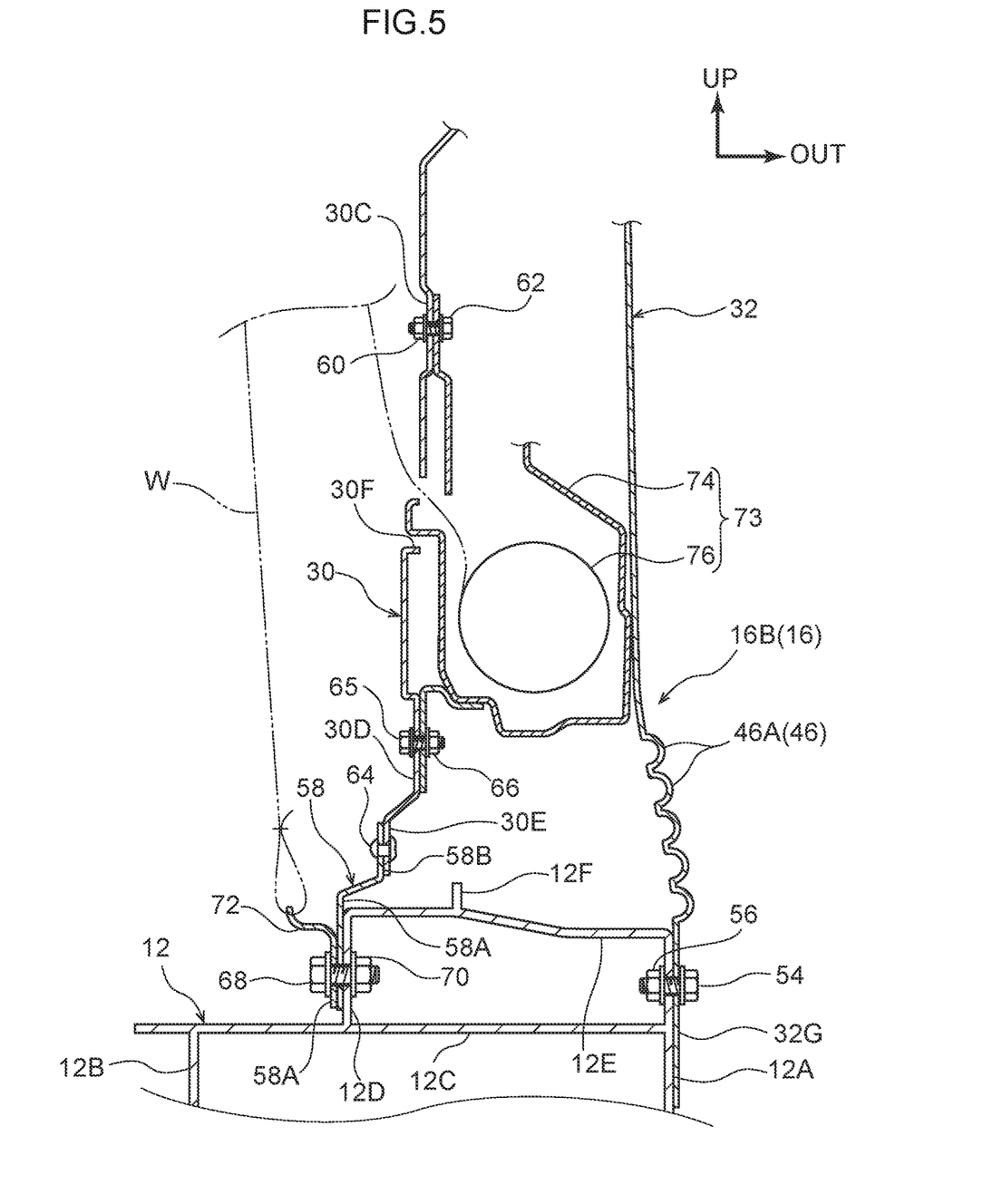

Now, a joining portion between the lower end portion 16B of the center pillar 16 and the rocker 12 is described in detail. As shown in FIG. 5, the rocker 12 is provided with an outer side vertical wall portion 12A, a first inner side vertical wall portion 12B and a dividing wall portion 12C. The outer side vertical wall portion 12A and first inner side vertical wall portion 12B are provided to be spaced apart in the vehicle width direction. The dividing wall portion 12C links the outer side vertical wall portion 12A with the first inner side vertical wall portion 12B in the vehicle width direction. Lower end portions of the outer side vertical wall portion 12A and the first inner side vertical wall portion 12B are linked to one another in the vehicle width direction by a lower wall portion. A chamber is structured by the outer side vertical wall portion 12A, first inner side vertical wall portion 12B, dividing wall portion 12C and lower wall portion.

A second inner side vertical wall portion 12D projects to the vehicle upper side from a region of the dividing wall portion 12C that is between the outer side vertical wall portion 12A and the first inner side vertical wall portion 12B. The outer side vertical wall portion 12A extends to the vehicle upper side relative to the dividing wall portion 12C. Upper end portions of the second inner side vertical wall portion 12D and the outer side vertical wall portion 12A are linked to one another in the vehicle width direction by an upper wall portion 12E. Thus, a chamber is structured by the outer side vertical wall portion 12A, second inner side vertical wall portion 12D, dividing wall portion 12C and upper wall portion 12E.

A door opening flange 12F projects to the vehicle upper side from the upper wall portion 12E. The door opening flange 12F structures the lower edge of the door aperture portion 22. A door seal is attached to a face at the vehicle width direction outer side of the door opening flange 12F.

Figure 3:
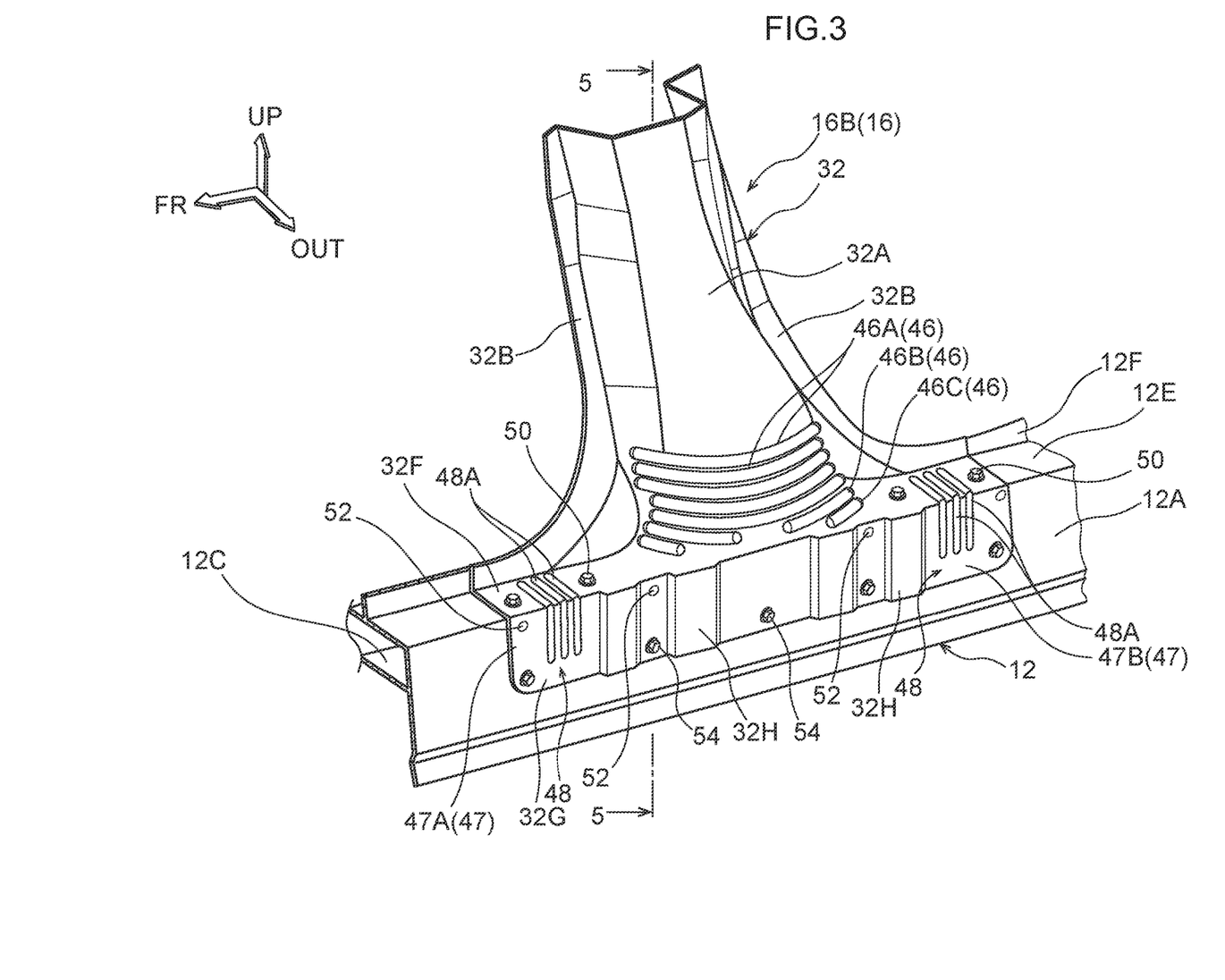
FIG. 3 is a magnified perspective view showing a magnification of a joining region between the center pillar and a rocker in FIG. 1.

As shown in FIG. 3, a lower end portion of the flange portion 32B of the center pillar 16 is widened in the vehicle front-and-rear direction along the door opening flange 12F of the rocker 12. The lower end portion of the flange portion 32B is superposed with the door opening flange 12F.

A third joining surface 32F projects to the vehicle width direction outer side along the upper wall portion 12E of the rocker 12 from the lower end portion of the flange portion 32B. The third joining surface 32F is superposed with the upper wall portion 12E, and is mechanically joined (fastened) thereto by bolts 50 and weld nuts.

More specifically, weld nuts are respectively attached to the back face side (chamber side) of the upper wall portion 12E of the rocker 12 at pairs of locations corresponding with each of two vehicle front-and-rear direction end portions of the third joining surface 32F. The bolts 50 are screwed in and threaded into the weld nuts from the vehicle outer side of the third joining surface 32F. Thus, in the present exemplary embodiment, the third joining surface 32F and the upper wall portion 12E of the rocker 12 are fastened together at four locations by the bolts 50 and weld nuts.

As shown in FIG. 3 and FIG. 5, a fourth joining surface 32G protrudes toward the vehicle lower side along the outer side vertical wall portion 12A of the rocker 12 from a vehicle width direction outer side end portion of the third joining surface 32F. The fourth joining surface 32G is superposed with the outer side vertical wall portion 12A and is temporarily joined thereto by blind rivets 52, which are temporary joining members. The fourth joining surface 32G and the outer side vertical wall portion 12A are mechanically joined (fastened) together by bolts 54 and weld nuts 56, which are fastening members.

More specifically, four protruding beads 32H that are spaced apart in the vehicle front-and-rear direction are formed on the fourth joining surface 32G. A region between a first of the protruding beads 32H from the front side and the second of the protruding beads 32H, and a region between the third of the protruding beads 32H from the front side and the fourth of the protruding beads 32H, are temporarily joined by the blind rivets 52. The blind rivets 52 are inserted from the vehicle outer side of the fourth joining surface 32G and expanded at the back face side (chamber side) of the outer side vertical wall portion 12A. Similarly, both vehicle front-and-rear direction end portions of the fourth joining surface 32G are temporarily joined by the blind rivets 52.

The weld nuts 56 are attached to the back face side of the outer side vertical wall portion 12A to correspond with positions at the vehicle lower side of the respective blind rivets 52. The bolts 54 are screwed in and threaded into the weld nuts 56 from the vehicle outer side of the fourth joining surface 32G. Similarly, a vehicle front-and-rear direction central portion of the fourth joining surface 32G is fastened to the outer side vertical wall portion 12A by one each of the weld nuts 56 and bolts 54. Thus, in the present exemplary embodiment, the fourth joining surface 32G and the outer side vertical wall portion 12A of the rocker 12 are fastened together by the bolts 54 and weld nuts 56 at five locations.

A lower end portion 30E of the pillar inner panel 30 is joined to the rocker 12 via a bracket 58. More specifically, the bracket 58 is attached to a face at the vehicle width direction inner side of the second inner side vertical wall portion 12D of the rocker 12. The bracket 58 projects to the vehicle upper side from the rocker 12. The bracket 58 is formed substantially in a crank shape of which a lower end portion 58A is disposed further to the vehicle width direction inner side than an upper end portion 58B as viewed from the vehicle front side. The lower end portion 58A of the bracket 58 is superposed with the second inner side vertical wall portion 12D of the rocker 12. The lower end portion 58A, together with an anchor member 72 that is described below, is fastened to the second inner side vertical wall portion 12D by bolts 68 and weld nuts 70.

The upper end portion 58B of the bracket 58 is superposed with the lower end portion 30E of the pillar inner panel 30 and is temporarily joined thereto by blind rivets 64. The upper end portion 58B and the lower end portion 30E of the pillar inner panel 30 are mechanically joined (fastened) together by bolts and weld nuts at positions that are spaced to the vehicle front side and the vehicle rear side relative to the blind rivets 64.

Joining positions of the upper end portion 58B of the bracket 58 with the lower end portion 30E of the pillar inner panel 30 are specified to be at the vehicle upper side relative to the door opening flange 12F formed at the rocker 12.

—Center Pillar Lower Portion Structure—

Now, a lower portion structure of the center pillar 16 is described. As shown in FIG. 3, a bellows portion 46 is provided at a lower end portion of the center pillar 16. Protrusions and recesses are formed in the bellows portion 46 to alternate in the vehicle vertical direction. The bellows portion 46 is provided at the vehicle upper side of the third joining surface 32F that is a joining portion between the center pillar 16 and the rocker 12.

The bellows portion 46 includes five first protrusion portions 46A, two second protrusion portions 46B and two third protrusion portions 46C, arrayed in the vehicle vertical direction. Each of the five first protrusion portions 46A is formed with a length direction in the vehicle front-and-rear direction from a front end portion to a rear end portion of the pillar outer panel 32, and a cross section of the first protrusion portion (46A) is a circular arc shape.

As shown in FIG. 5, a region of the pillar outer panel 32 in which the first protrusion portions 46A are formed is angled to the vehicle width direction outer side from the vehicle upper side toward the vehicle lower side. This region is formed in a wave shape in a cross section seen from the vehicle front side. The first protrusion portions 46A are formed at the vehicle upper side relative to the fourth joining surface 32G, and are formed at the vehicle lower side relative to a retractor 73, which is described below. The retractor 73 serves as a take-up device for a webbing W.

As shown in FIG. 3, the second protrusion portions 46B are formed at the vehicle lower side of the first protrusion portions 46A. The second protrusion portions 46B are formed with shorter lengths in the vehicle front-and-rear direction than the first protrusion portions 46A. The second protrusion portions 46B are formed below the front side of the fifth first protrusion portion 46A from the top and below the rear side of the same first protrusion portion 46A. The third protrusion portions 46C are formed below the second protrusion portions 46B. Lengths of the third protrusion portions 46C in the vehicle front-and-rear direction are shorter than the second protrusion portions 46B. The third protrusion portions 46C are formed at the front end side of the second protrusion portion 46B that is at the front side and at the rear end side of the second protrusion portion 46B that is at the rear side.

Front and rear bellows portions 48, in which protrusions and recesses are formed to alternate in the vehicle front-and-rear direction, are provided at the third joining surface 32F and the fourth joining surface 32G. More specifically, the front and rear bellows portions 48 are provided at a widened portion 47 at which the third joining surface 32F and the fourth joining surface 32G are widened to the vehicle front-and-rear direction outer sides relative to the bellows portion 46. In the present exemplary embodiment, the front and rear bellows portions 48 are provided at each of a widened portion 47A that is at the front side relative to the bellows portion 46 and a widened portion 47B that is at the rear side relative to the bellows portion 46.

The front and rear bellows portions 48 each include three fourth protrusion portions 48A arrayed in the vehicle front-and-rear direction. Each of the fourth protrusion portions 48A extends from an inner end to an outer end of the third joining surface 32F in the vehicle width direction, and hence continues from the outer end of the third joining surface 32F and extends to the vehicle lower side, as far as a lower end portion of the fourth joining surface 32G. Thus, the fourth protrusion portions 48A are formed substantially in "L" shapes.

As shown in FIG. 5, the retractor 73 for taking up the webbing W is provided inside the center pillar 16. The retractor 73 is retained in a state of being sandwiched between the pillar outer panel 32 and the pillar inner panel 30 at the vehicle upper side of the bellows portion 46. The retractor 73 is provided with a case 74 that structures an outer shell thereof. The case 74 is formed substantially in a box shape of which the vehicle upper side is open. A lower end portion of the case 74 is fastened to a lower portion fastening region 30D of the pillar inner panel 30 by bolts 65 and weld nuts 66. An upper end portion of the case 74 is fastened to an upper portion fastening region 30C of the pillar inner panel 30 by bolts 60 and weld nuts 62.

A spool 76 is accommodated in the case 74. One end side of the webbing W is wound onto the spool 76. Another end side of the webbing W is drawn out into the vehicle cabin through an aperture portion 30F formed in the pillar inner panel 30. The webbing W that is pulled out into the vehicle cabin is wound round a belt guide or the like provided at an upper side of the vehicle cabin interior, and another end portion of the webbing W is fixed to the anchor member 72 that is fastened to the rocker 12. The vehicle width direction inner side of the retractor 73 is covered by the pillar inner panel 30, except at the aperture portion 30F. The meaning of the term "covered" as used herein is not limited to a structure in which the vehicle width direction inner side of the retractor 73 is completely covered by the pillar inner panel 30 but is intended to include a structure in which an aperture for drawing out the webbing W or the like is formed with a size such that the retractor 73 cannot be post-installed.

Operation and Effects

Now, operation and effects of the present exemplary embodiment are described.

In the vehicle side portion structure according to the present exemplary embodiment, as shown in FIG. 3, the bellows portion 46 is provided at the vehicle upper side of the third joining surface 32F that is a joining portion between the center pillar 16 and the rocker 12. Accordingly, if a relative displacement of the center pillar 16 to the vehicle width direction inner side relative to the rocker 12 during a side collision is large and a tensile load is applied to the lower end portion 16B of the center pillar 16, the bellows portion 46 may be stretched out and thus breakage of the lower end portion 16B may be inhibited. This operation is described in more detail below.

For example, if the vehicle according to the present exemplary embodiment is an electric vehicle whose drive source is electric energy, a battery may be mounted in a region between the left and right rockers 12. In this vehicle, in order to suppress the application of a collision load to the battery during a side collision, each rocker 12 is designed such that a yield strength thereof is high, by being formed of high-tensile steel, a plate thickness thereof being increased, or the like. Consequently, a displacement of the rocker 12 of the electric vehicle to the vehicle width direction inner side when a side collision occurs is smaller than in a vehicle whose only drive source is an engine (a "conventional car").

Meanwhile, similarly to a conventional car, the center pillar 16 displaces to the vehicle width direction inner side in the electric vehicle too. As a result, in the vehicle in which the yield strength of the rocker 12 is raised, a relative displacement amount of the center pillar 16 to the vehicle width direction inner side relative to the rocker 12 is larger. Consequently, a tensile load acting on the lower end portion 16B of the center pillar 16 is large.

Figure 6:
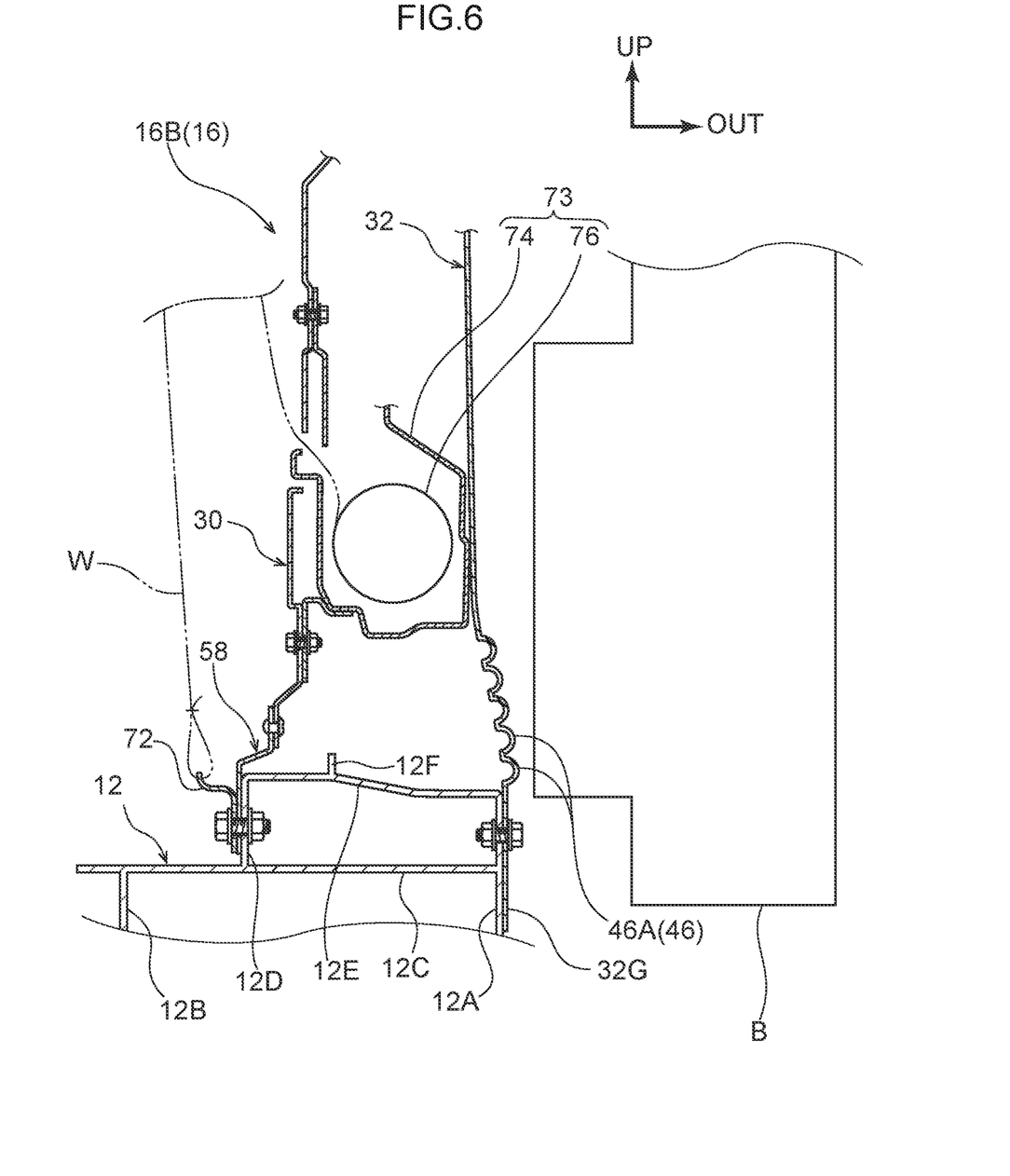
FIG. 6 is a sectional diagram corresponding to FIG. 5, showing a state in which a barrier has intruded.

In the present exemplary embodiment, the bellows portion 46 is provided. Therefore, as shown in FIG. 6, when a barrier B collides with the center pillar 16 from sideward of the vehicle, the first protrusion portions 46A forming the bellows portion 46 are stretched out in the vehicle vertical direction by a tensile load applied to the lower end portion 16B of the center pillar 16. Similarly, the second protrusion portions 46B and third protrusion portions 46C are stretched out in the vehicle vertical direction (see FIG. 3). Thus, at least a portion of the tensile load acting on the joining portion between the rocker 12 and the center pillar 16 may be absorbed, and breakage of the lower end portion 16B of the center pillar 16 may be inhibited.

In the present exemplary embodiment, as shown in FIG. 3, the joining portion of the center pillar 16 with the rocker 12 is provided with the widened portion 47 that is widened to the vehicle front-and-rear direction outer sides relative to the bellows portion 46. Therefore, a joining area between the center pillar 16 and the rocker 12 is larger and may be joined more securely than in a structure in which the widened portion 47 is not provided. Moreover, because the front and rear bellows portions 48 are provided at the widened portion 47, when a tensile load acts on the widened portion 47 in the vehicle front-and-rear direction during a side collision, the front and rear bellows portions 48 may be stretched out in the vehicle front-and-rear direction, and thus breakage of the center pillar 16 may be inhibited. That is, the center pillar 16 and the rocker 12 may be securely joined and the joined state may be excellently maintained.

In the present exemplary embodiment, as shown in FIG. 6, the retractor 73 is provided inside the center pillar 16. Therefore, during a side collision, a portion of a collision load from a barrier B that is a collision object may be absorbed by the collision load being applied to the retractor 73. Consequently, a displacement amount of the lower portion of the center pillar 16 to the vehicle width direction inner side during the side collision is reduced, and a tensile load applied to the bellows portion 46 may be moderated. In particular, in a structure in which the vehicle width direction inner side of the retractor 73 is covered by the pillar inner panel 30 as in the present exemplary embodiment, the retractor 73 may be crushed between the pillar outer panel 32 and the pillar inner panel 30 during the side collision and may absorb impact energy effectively.

In the present exemplary embodiment, as shown in FIG. 3 and FIG. 5, the rocker 12 and the center pillar 16 are temporarily joined by the blind rivets 52 and then mechanically joined by the bolts 50 and 54 and the weld nuts 56. Therefore, the center pillar 16 may be joined while being pressed against the rocker 12. Thus, even if the center pillar 16 is warped due to the effect of springback or the like, the center pillar 16 may be joined to the roof rail 14 and the rocker 12 securely. In other words, the joined state of the center pillar 16 may be excellently maintained regardless of material properties of the center pillar 16.

The vehicle side portion structure has been described above in accordance with an exemplary embodiment and variant examples. However, numerous modes may be embodied within a technical scope not departing from the gist. For example, numbers, lengths and the like of the first protrusion portions 46A, second protrusion portions 46B and third protrusion portions 46C constituting the bellows portion 46 are not particularly limited. Similarly, numbers, lengths and the like of the fourth protrusion portions 48A constituting the front and rear bellows portions 48 are not particularly limited.

In the exemplary embodiment described above, the center pillar 16 has been described as an example of a pillar, but this is not limiting. For example, a similar structure may be employed at the front pillar 18, a rear pillar or the like.

In the present exemplary embodiment, the rocker 12 is formed of an extrusion molded piece, but this is not limiting. For example, a rocker may be employed that is formed of two steel plates—a rocker inner panel and a rocker outer panel.

An object of the present disclosure is to provide a vehicle side portion structure that may inhibit breakage of a lower portion of a pillar when a side collision occurs.

A first aspect of a vehicle side portion structure includes: a rocker provided at a vehicle width direction outer side end portion of a lower portion of a vehicle body, the rocker extending in a vehicle front-and-rear direction; and a pillar that extends in a vehicle vertical direction, a lower end portion of the pillar being joined to the rocker. A bellows portion is provided at the lower end portion of the pillar. The bellows portion is provided at a vehicle upper side of a joining portion of the pillar with the rocker, and protrusions and recesses are formed in the bellows portion to alternate in the vehicle vertical direction.

In the vehicle side portion structure of the first aspect, the rocker is provided at the vehicle width direction outer side end portion of the lower portion of the vehicle body, and the rocker extends in the vehicle front-and-rear direction. The pillar that extends in the vehicle vertical direction is joined to the rocker. The bellows portion is provided at the lower end portion of the pillar, at the vehicle upper side of the joining portion with the rocker. The protrusions and recesses are formed in the bellows portion to alternate in the vehicle vertical direction. Hence, when a side collision occurs ("during a side collision" where appropriate below), if a relative displacement amount of the pillar to the vehicle width direction inner side relative to the rocker is large and a tensile load is applied to the lower portion of the pillar, the bellows portion is stretched out. Thus, breakage of the lower portion of the pillar may be inhibited.

A second aspect is the first aspect of the vehicle side portion structure. The joining portion of the pillar with the rocker is provided with a widened portion that is widened to vehicle front-and-rear direction outer sides relative to the bellows portion; and front and rear bellows portions are provided at the widened portion, protrusions and recesses being formed in the front and rear bellows portions to alternate in the vehicle front-and-rear direction.

In the vehicle side portion structure of the second aspect, the widened portion that extends to the vehicle front-and-rear direction outer sides relative to the bellows portion is provided at the pillar at the joining portion with the rocker. Therefore, the pillar and the rocker may be joined more securely than in a structure in which the widened portion is not provided. Furthermore, because the front and rear bellows portions are provided at the widened portion, when a tensile load in the vehicle front-and-rear direction is applied to the widened portion during a side collision, the front and rear bellows portions are stretched out. Thus, breakage of the pillar may be inhibited.

A third aspect is the first of the second aspect of the vehicle side portion structure. A webbing take-up device is provided inside the pillar at the vehicle upper side of the bellows portion.

In the vehicle side portion structure of the third aspect, a portion of an impact load from a collision body during a side collision may be absorbed by the impact load being applied to the take-up device. Consequently, a displacement amount of the lower portion of the pillar to the vehicle width direction inner side during the side collision may be reduced, and a tensile load applied to the bellows portion may be moderated.

A fourth aspect is any of the first to the third aspect of the vehicle side portion structure. The rocker and the pillar are mechanically fastened together by fastening members.

In the vehicle side portion structure of the fourth aspect, because the rocker and the pillar are fastened mechanically, the joined state of the pillar may be excellently maintained regardless of material properties of the pillar. That is, when a pillar is formed of high-tensile steel (high tensile strength steel plate) in order to reduce weight, warping of the pillar may be caused by springback during press-forming, which leads to welding failures and the like. However, when the rocker and the pillar are mechanically fastened, the pillar may be joined while being pressed against a framework member. Thus, even if the pillar is warped due to the effect of springback or the like, the pillar may be securely joined to the framework member.

According to the vehicle side portion structure of the first aspect, breakage of the lower portion of the pillar during a side collision may be inhibited.

According to the vehicle side portion structure of the second aspect, the pillar and the rocker may be securely joined and the joined state may be excellently maintained.

According to the vehicle side portion structure of the third aspect, breakage of the lower portion of the pillar during a side collision may be inhibited effectively.

According to the vehicle side portion structure of the fourth aspect, the joined state of the pillar and the rocker may be excellently maintained regardless of material properties of the pillar.

What is claimed is:

1. A vehicle side portion structure comprising:
    a rocker provided at a vehicle width direction outer side end portion of a lower portion of a vehicle body, the rocker extending in a vehicle front-and-rear direction; and
    a pillar that extends in a vehicle vertical direction, a lower end portion of the pillar being joined to the rocker,
    wherein a bellows portion is provided at the lower end portion of the pillar, the bellows portion being provided at a vehicle upper side of a joining portion of the pillar with the rocker, and protrusions and recesses being formed in the bellows portion to alternate in the vehicle vertical direction, and
    wherein the bellows portion comprises:
        a first protrusion portion formed with a length direction in the vehicle front-and-rear direction from a front end portion to a rear end portion of an outer panel of the pillar, a cross section of the first protrusion portion being a circular arc shape;
        second protrusion portions formed below a front side and below a rear side of the first protrusion portion; and
        third protrusion portions formed below a front end and below a rear end of the second protrusion portions.

2. The vehicle side portion structure according to claim 1, wherein:
    the joining portion of the pillar with the rocker is provided with a widened portion that is widened to vehicle front-and-rear direction outer sides relative to the bellows portion; and
    front and rear bellows portions are provided at the widened portion, protrusions and recesses being formed in the front and rear bellows portions to alternate in the vehicle front-and-rear direction.

3. The vehicle side portion structure according to claim 2, wherein the front and rear bellows portions include fourth protrusion portions that:
    extend in the vehicle width direction from an inner end to an outer end of a third joining surface, the third joining surface being the joining portion of the pillar with the rocker, and
    extend from a vehicle width direction outer side end portion of the third joining surface to a lower end of a fourth joining surface that extends toward a vehicle lower side along an outer side vertical wall portion of the rocker.

4. The vehicle side portion structure according to claim 1, wherein the rocker and the pillar are mechanically fastened together by fastening members.

5. The vehicle side portion structure according to claim 1, wherein the pillar is a center pillar.

6. A vehicle side portion structure comprising:
    a rocker provided at a vehicle width direction outer side end portion of a lower portion of a vehicle body, the rocker extending in a vehicle front-and-rear direction; and
    a pillar that extends in a vehicle vertical direction, a lower end portion of the pillar being joined to the rocker,
    wherein a bellows portion is provided at the lower end portion of the pillar, the bellows portion being provided at a vehicle upper side of a joining portion of the pillar with the rocker, and protrusions and recesses being formed in the bellows portion to alternate in the vehicle vertical direction, and
    wherein a webbing take-up device is provided inside the pillar at the vehicle upper side of the bellows portion.

* * * * *